United States Patent
Bent et al.

(10) Patent No.: US 9,615,505 B2
(45) Date of Patent: Apr. 11, 2017

(54) RUN SELECTION MECHANISM

(71) Applicant: CNH Industrial Canada, Ltd., Saskatoon (CA)

(72) Inventors: Ethan Bent, Saskatoon (CA); Dennis Thompson, Saskatton (CA); Dennis Chahley, Martensville (CA); Darwin Zacharias, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/145,124

(22) Filed: May 3, 2016

(65) Prior Publication Data
US 2016/0242353 A1    Aug. 25, 2016

Related U.S. Application Data

(62) Division of application No. 13/841,475, filed on Mar. 15, 2013, now Pat. No. 9,363,942.

(51) Int. Cl.
*B65G 51/24* (2006.01)
*A01C 7/08* (2006.01)
*B65G 53/04* (2006.01)
*B65G 53/46* (2006.01)

(52) U.S. Cl.
CPC .............. *A01C 7/084* (2013.01); *A01C 7/081* (2013.01); *B65G 53/04* (2013.01); *B65G 53/4608* (2013.01); *Y10T 137/86501* (2015.04)

(58) Field of Classification Search
USPC ........ 406/123, 125, 181, 182, 183; 111/175; 137/625.11
See application file for complete search history.

(56) References Cited

U.S. PATENT DOCUMENTS

| | | |
|---|---|---|
| 2,230,846 A | 2/1941 | Jack |
| 2,989,348 A | 4/1951 | Stone |
| 3,171,426 A | 3/1965 | Lang |
| 3,202,167 A | 8/1965 | De Young et al. |
| 3,326,609 A | 6/1967 | Auten et at |
| 3,408,115 A | 10/1968 | Ferdinand |
| 3,556,604 A | 1/1971 | Round |
| 3,900,137 A | 8/1975 | Bricout et al. |
| 3,954,331 A * | 5/1976 | Smith ................ G03G 15/0868 222/DIG. 1 |

(Continued)

FOREIGN PATENT DOCUMENTS

| | | |
|---|---|---|
| AU | 717761 | 3/1999 |
| CA | 2242044 | 1/2000 |

(Continued)

*Primary Examiner* — Joseph Dillon, Jr.
(74) *Attorney, Agent, or Firm* — Rebecca L. Henkel; Richard K. DeMille (57) ABSTRACT

A run selection mechanism is provided for selectively directing the flow of particulate material from an air cart. The mechanism includes a chute for receiving metered particulate material. The chute has an output. A first primary conduit has an output communicating with a first pneumatic primary run and a second primary conduit has an output communicating with a second pneumatic primary run. A selector selectively directs the metered particulate material to one of the output of the chute, the first pneumatic primary run and the second pneumatic primary run.

7 Claims, 8 Drawing Sheets

(56) References Cited

U.S. PATENT DOCUMENTS

| | | |
|---|---|---|
| 4,045,091 A | 8/1977 | Beneke |
| 4,516,888 A | 5/1985 | Kardinal |
| 4,747,541 A * | 5/1988 | Morine ............... A21B 3/16 118/25 |
| 4,779,765 A | 10/1988 | Neumeyer |
| 5,069,583 A | 12/1991 | Caldwell |
| 5,265,547 A | 11/1993 | Daws |
| 5,592,889 A | 1/1997 | Bourgault |
| 5,749,682 A | 5/1998 | Epting |
| 5,775,532 A * | 7/1998 | Bullivant ............ G05D 7/0605 222/1 |
| 5,980,163 A | 11/1999 | Gregor et al. |
| 5,996,515 A | 12/1999 | Gregor et al. |
| 6,148,748 A | 11/2000 | Bardi et al. |
| 6,213,690 B1 | 4/2001 | Gregor et al. |
| 6,220,793 B1 | 4/2001 | Meyer |
| 6,325,004 B1 | 12/2001 | Smith |
| 6,527,205 B2 | 3/2003 | Andersson et al. |
| 6,834,599 B1 | 12/2004 | Fuessel et al. |
| 7,104,207 B2 | 9/2006 | Wake et al. |
| 7,156,029 B2 | 1/2007 | Harnetiaux |
| 8,151,719 B2 | 4/2012 | Audette |
| 8,905,681 B2 * | 12/2014 | Schneider ............. B65G 53/06 209/139.1 |
| 2012/0174844 A1 | 7/2012 | Friggstad |

FOREIGN PATENT DOCUMENTS

| | | |
|---|---|---|
| CA | 2648452 | 12/2009 |
| CA | 2746376 | 7/2012 |
| CA | 2748706 | 7/2012 |
| DE | 614135 | 6/1935 |

* cited by examiner

RUN SELECTION MECHANISM

CROSS-REFERENCE TO RELATED APPLICATION

This application is a divisional of application Ser. No. 13/841,475 filed Mar. 15, 2013.

FIELD OF THE INVENTION

The invention relates generally to agricultural systems, and in particular, to a run selection mechanism for an air seeder which allows product to be introduced into a selected one of a plurality of pneumatic runs without disturbing the air flow/product flow already in the selected run.

BACKGROUND OF THE INVENTION

Modern large acreage seeding implements pneumatically deliver particulate materials, such as seed, fertilizer, and/or other product, to fields. By way of example, the seeding implement may take the form of an air cart and an air drill combination which is pulled behind a tractor to deliver the product(s). Different seeding styles can be implemented by using different openers on the air drills. For example, knife, ribbon band, ribbon band sweep, double-shoot, and disk openers may be used for different seeding styles in order to can open correspondingly different styles of furrows to receive the seed. The air cart includes one or more storage compartments that hold product(s), each of which has an associated metering box. Each metering box divides the products from the associated storage compartments into equal sections. The equal sections of products from selected storage compartments are sequentially delivered to a run wherein the equally divided products are entrained in an airflow established by a fan. Once entrained in the run, the equal sections of products are directed from the air cart, thiough manifolds and distribution lines, to the air drill, wherein the products are distributed.

In order to facilitate the delivery of the metered product to the desired run, a collector assembly is often used. By way of example, Fuessel et al. U.S. Pat. No. 6,834,599 discloses a collector assembly mounted below a product supply tank for receiving plural streams of materials metered from the tank. Individual upright passages through the body corresponding in number to the metered streams from the tank receive the gravitating product streams and direct each stream into either or both of an upper loading zone and a lower loading zone in the passage. A diverter valve associated with each upper loading zone can be set to close off the upper loading zone entirely while opening only the lower zone or closing off the lower loading zone while opening only the upper loading zone. Thus, air streams or runs passing transversely through the upper and lower loading zones respectively can be supplied with variable amounts of metered product, depending upon the position of the diverter valve within each passage. By providing multiple supply tanks and multiple collector assemblies, various product delivery scenarios can be achieved including single shoot, double shoot and triple shoot effects.

While functional for its intended purpose, the collector assembly disclosed in the '599 patent has certain limitations. For example, the calibration and cleanout of the collector assemblies can be both difficult and time consuming. More specifically, in order to effectuate such a cleanout, the floor of each collector assembly must be removed by unscrewing a plurality of wing nuts, thereby causing the floor of the collector assembly to drop out. The diverter valves for the collector assembly are then adjusted so as allow the contents of the overhead tank to drop straight through the collector assembly passing the upper loading zone. Similarly, calibration of the metering box is achieved in a manner similar to the cleanout operation. More specifically, the floor of a collector assembly is removed and replaced with a calibrating receptacle. Product can be run through the metering mechanism of the metering box and discharged directly into the calibrating container for measurement. Desired adjustments of the metering mechanism may then be carried out.

Therefore, it is a primary object and feature of the present invention to provide a run selection mechanism for an air seeder which allows product to be introduced into a selected one of a plurality of pneumatic runs without disturbing the air flow/product flow already therein.

It is a further object and feature of the present invention to provide a run selection mechanism for an air seeder wherein the cleanout thereof is simpler and less time consuming than prior mechanisms.

It is a still further object and feature of the present invention to provide a run selection mechanism for an air seeder which allows a user to simply and easily calibrate a metering box attached thereto.

SUMMARY OF THE INVENTION

In accordance with the present invention, a run selection mechanism is provided for selectively directing the flow of particulate material from an air cart. The mechanism includes a particulate meter for selectively metering the particulate material and a chute for receiving the metered particulate. The chute has an input and an output. A first primary conduit has an input communicating with the chute and an output communicating with a first pneumatic primary run. A second primary conduit has an input communicating with the chute and an output communicating with a second pneumatic primary run. A selector is movable between a calibration position, a first primary position and a second primary position. In the calibration position, the particulate material flows from the particulate meter to the output of the chute. In the first primary position, the particulate material flows from the particulate meter to the output of the first primary conduit. In the second primary position, the particulate material flows from the particulate meter to the output of the second primary conduit.

A meter module is provided for housing the particulate meter. The meter module including an input for receiving the particulate material from the air cart, a particulate output for directing particulate from the particulate meter to the input of the chute, and a meter cleaning output. The selector may be further movable to cleanout position wherein the meter cleaning output communicates with the chute. The meter cleaning output is isolated from the chute with the selector in the calibration position.

In a first embodiment, the selector includes first and second rotatable members. The first and second rotatable members include passageways therethrough which partially define the chute. Alternatively, the selector may include pivotable first and second gates. The first gate isolates the first primary conduit from the chute and the second gate isolating the second primary conduit from the chute with the selector in the calibration position. The first gate isolates the output of the chute from the input of the chute with the selector in the first primary position. The first gate isolates the first primary conduit from the chute and the second gate isolates the output of the chute from the input of the chute with the selector in the second primary position.

In accordance with a further aspect of the present invention, a run selection mechanism is provided for selectively directing the flow of particulate material from an air cart. The mechanism includes a meter module having an input communicating with the particulate material in the air cart and a particulate output. A meter disposed in the meter module for selectively metering the particulate material to the particulate output. A chute has an input communicating with the output of the meter and an output. A first primary conduit has an input communicatable with the chute and an output communicating with a first pneumatic primary run. A second primary conduit has an input communicatable with the chute and an output communicating with a second pneumatic primary run. A selector selectively directs the flow of the particulate material to one of output of the chute, the first pneumatic primary run and the second pneumatic primary run.

The meter module includes a meter cleanout output and the selector is movable to a cleanout position wherein the meter cleaning output communicates with the chute. The meter cleaning output is isolated from the chute with the selector in a calibration position wherein the flow of the particulate material is directed to the output of the chute.

In a first embodiment, the selector includes first and second rotatable members. The first and second rotatable members includes passageways therethrough. The passageways partially define the chute. Alternatively, the selector includes pivotable first and second gates. The first gate isolates the first primary conduit from the chute and the second gate isolates the second primary conduit from the chute with the selector in a calibration position wherein the flow of the particulate material is directed to the output of the chute. The first gate isolates the output of the chute from the input of the chute with the selector in a first primary position wherein the flow of the particulate material is directed to the first pneumatic primary run. The first gate isolates the first primary conduit from the chute and the second gate isolates the output of the chute from the input of the chute with the selector in the second primary position wherein the flow of the particulate material is directed to the second pneumatic primary run.

In accordance with a still further aspect of the present invention, a run selection mechanism is provided for selectively directing the flow of particulate material from an air cart. The mechanism includes a chute for receiving metered particulate material. The chute has an output. A first primary conduit has an output communicating with a first pneumatic primary run and a second primary conduit has an output communicating with a second pneumatic primary run. A selector selectively directs the metered particulate material to one of the output of the chute, the first pneumatic primary run and the second pneumatic primary run.

In a first embodiment, the selector includes first and second rotatable members. The first and second rotatable members include passageways therethrough. The passageways partially defining the chute. Alternatively, the selector includes pivotable first and second gates. The first gate isolates the first primary conduit from the chute and the second gate isolating the second primary conduit from the chute with the selector in a calibration position wherein the metered particulate material is directed to the output of the chute. The first gate isolates the first primary conduit from the output of the chute with the selector in a first primary position wherein the metered particulate material is directed to the first pneumatic primary run. The first gate isolates the first primary conduit from the chute and the second gate isolating the output of the chute from the second primary conduit with the selector in a second primary position wherein the flow of the particulate material is directed to the second pneumatic primary run.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
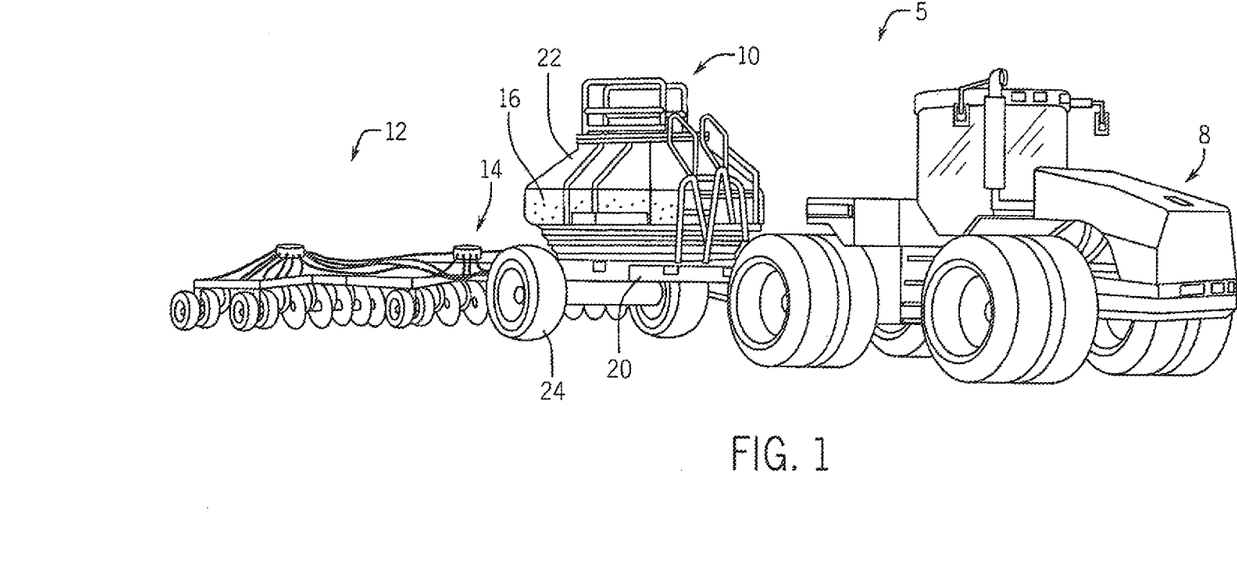
FIG. 1 is an isometric view of an agricultural particulate material delivery system incorporating a run selection mechanism in accordance with the present invention.

Referring to FIG. 1, an agricultural particulate material delivery system is generally designated by the reference numeral 5. System 5 includes tractor 8, air cart 10, and a drill 12. Air cart 10 and drill 12 are hitched to tractor 8 and/or each other in a conventional manner. A pneumatic distribution system 14 is arranged with respect to air cart 10 and the drill 12 pneumatically delivering product 16 from air cart 10 to drill 12 for pneumatic distribution of the product to an agricultural field. Product 16 is a particulate material that may take the form of seed, such as small grains, and/or fertilizer, such as dry granular fertilizer. The pneumatic distribution system 14 includes a fan(s) (not shown) which may be a centrifugal fan, for generating an airflow(s) that is directed through pneumatic distribution system 14 to entrain product 16 for pneumatic delivery to an agricultural field.

Figure 2:
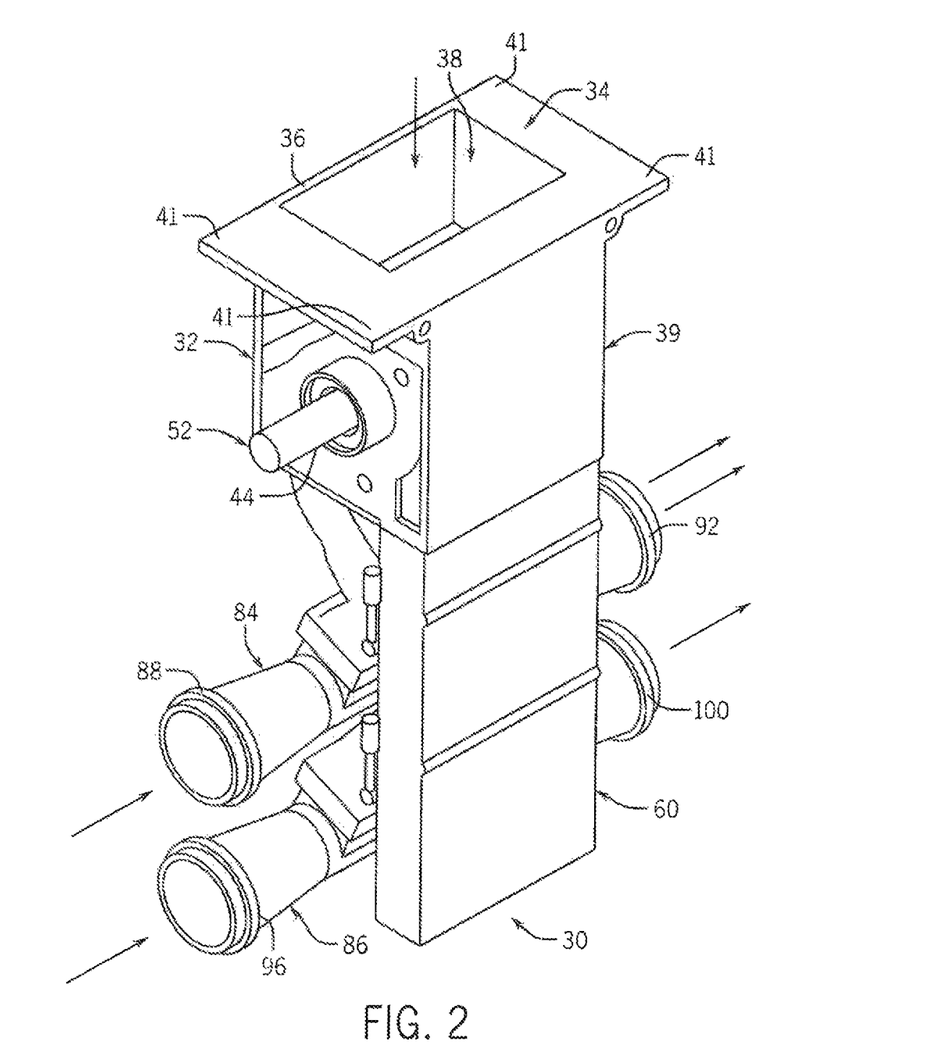
FIG. 2 is an isometric view of a run selection mechanism in accordance with the present invention.

As is conventional, air cart 10 includes frame 20 to which storage compartments 22 and wheels 24 are mounted. Each storage compartment 22 has an associated run selection mechanism 30 arranged at its lower end for receiving product 16 from the storage compartment 22. As best seen in FIG. 2, each run selection mechanism 30 includes meter module 32 having mounting plate 34 provided at the upper end thereof. Mounting plate 34 includes central opening 36 for allowing access to intake 38 of meter module 32 and a plurality of through holes 41 therein to facilitate the mounting of run selection mechanism 30 to a corresponding storage compartment 22

Referring to FIGS. 3-6, meter module 32 includes housing 39 defining a chamber 40 for receiving metering roller 42 therein. Intake 38 interconnects chamber 40 with the interior of a corresponding storage compartment 22 for delivering product 16 to metering roller 42. As described, metering roller 42 of each run selection device 30 is supported on rotatable shaft 44 extending through housing 39 between intake 38 and metered product output 48. Metering roller 42 defines a drum-like shape and includes multiple compartments not shown) arranged at an outer circumferential surface thereof. The compartments are sized to convey and control the volume and rate of product 16 transferred through meter module 32 for delivery out of metered product output 48. Housing 39 further includes cleanout output 50 provided at the lower end thereof. As hereinafter described, cleanout output 50 facilitates the cleaning out of undelivered product 16 retained in meter module 32 after operation thereof.

As best seen in FIG. 2, first end 52 of shaft 44 extends laterally from housing 39 and is operatively connected to a prime mover (not shown). It can be appreciated that the prime mover may be coupled to shaft 44 in any conventional manner such as by end-to-end axial coupling or through one or more intermediate gears. Alternatively, shaft 44 may be replaced with a motor shaft that extends inside the housing to direct drive the metering roller 42, without deviating from the scope of the present invention. It is intended for the prime mover to be operatively connected to a controller for the controlling the actuation thereof. In response to actuation of the prime mover by the controller, shaft 44 and metering roller 50 rotate in unison with each other, for reasons hereinafter described.

Run selection module 30 farther includes a collector assembly, generally designated by the reference numeral 60. Collector assembly 60 includes metered product input 62 in communication with metered product output 50 of housing 39 of metered module 32 and cleanout input 64 in communication with metered cleanout output 50 of housing 39 of meter module 32. Metered product input 62 communicates with chute 66. Chute 66 extends axially through collector assembly 60 and terminates at output 68. Chute 66 is defined by inner surface 70 having first and second axially spaced stops 72 and 74, respectively, provided therein for reasons hereinafter described.

Cleanout input 64 of collector assembly 60 communicates with cleanout passage 76. Cleanout passage 76 extends through collector assembly 60 and terminates at output 78, which in turn, communicates with chute 66 at a location downstream of metered product input 62. Cleanout passage 76 is defined by inner surface 80 having a recessed stop 82 formed at a first side thereof at a location adjacent output 78, for reasons hereinafter described, and intersecting inner surface 70 of chute 66 at intersection 83.

Collector assembly 60 further includes first and second run load connectors 84 and 86, respectively. Referring back to FIG. 2, first run load connector 84 is generally tubular in shape and includes an upstream end 88 receivable within an upstream portion of a first primary run and a downstream end 92 receivable within a downstream portion of the first primary run. The downstream portion of the first primary run is operatively connected to corresponding drill 12 for pneumatic distribution of the product to an agricultural field. Similarly, second run load connector 86 is generally tubular in shape and includes an upstream end 96 receivable within an upstream portion of a second primary run and a downstream end 100 receivable within a downstream portion of the second primary run. The downstream portion of the second primary run is operatively connected to drill 12 for pneumatic distribution of the product to an agricultural field.

First run conduit 104 extends through collector assembly 60 has an input 105 communicating with cleanout passage 76 and an output 108 communicating with interior 110 of first run load connector 84. First run conduit 104 is defined by inner surface 112 intersecting inner surface 70 of chute 66 at intersection 114 and intersecting inner surface 80 of cleanout passage 76 at intersection 116. Similarly, second run conduit 106 extends through collector assembly 60, has an input 109 communicating with chute 66 at a location downstream of output 78 of cleanout passage 76, and an output 116 communicating with interior 118 of second run load connector 86. Second run conduit 106 is defined by inner surface 120 intersecting inner surface 70 of chute 66 at intersections 122 and 123.

Figure 8:
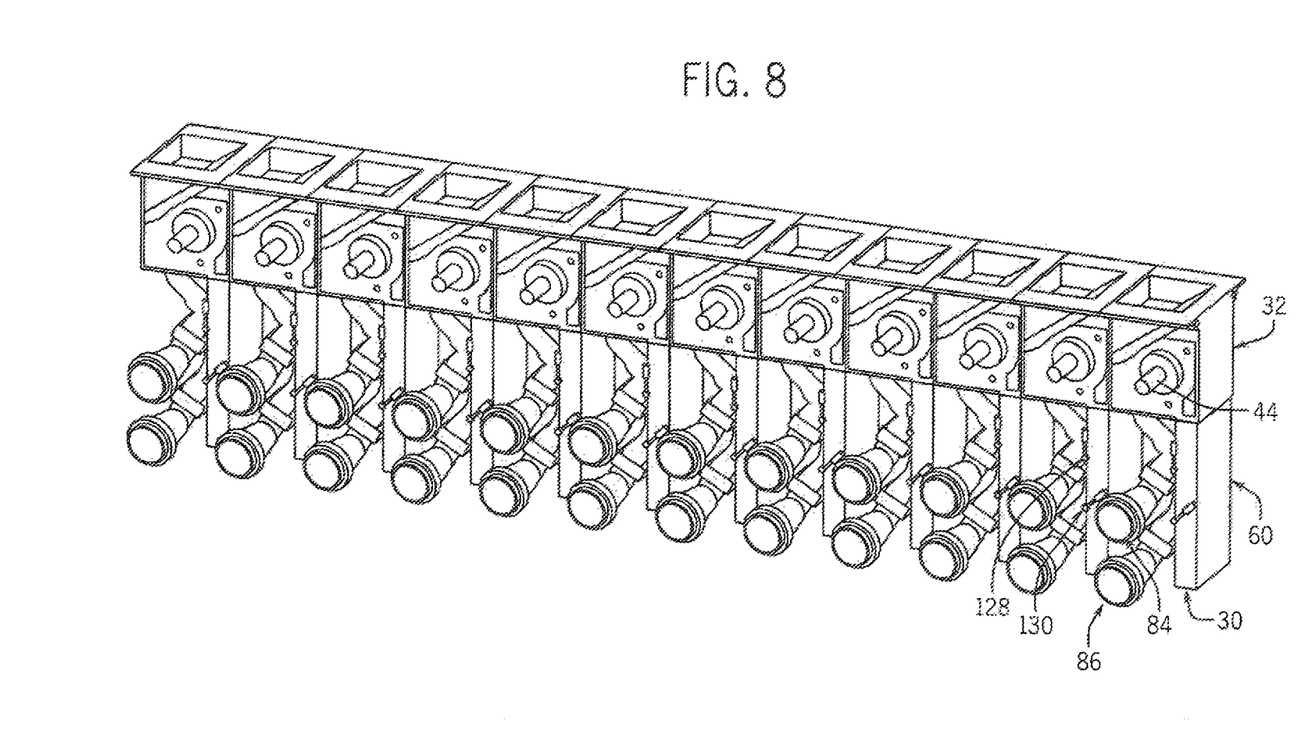
FIG. 8 is a schematic view showing multiple run selection mechanisms of the present invention positioned adjacent each other.
Figure 9:
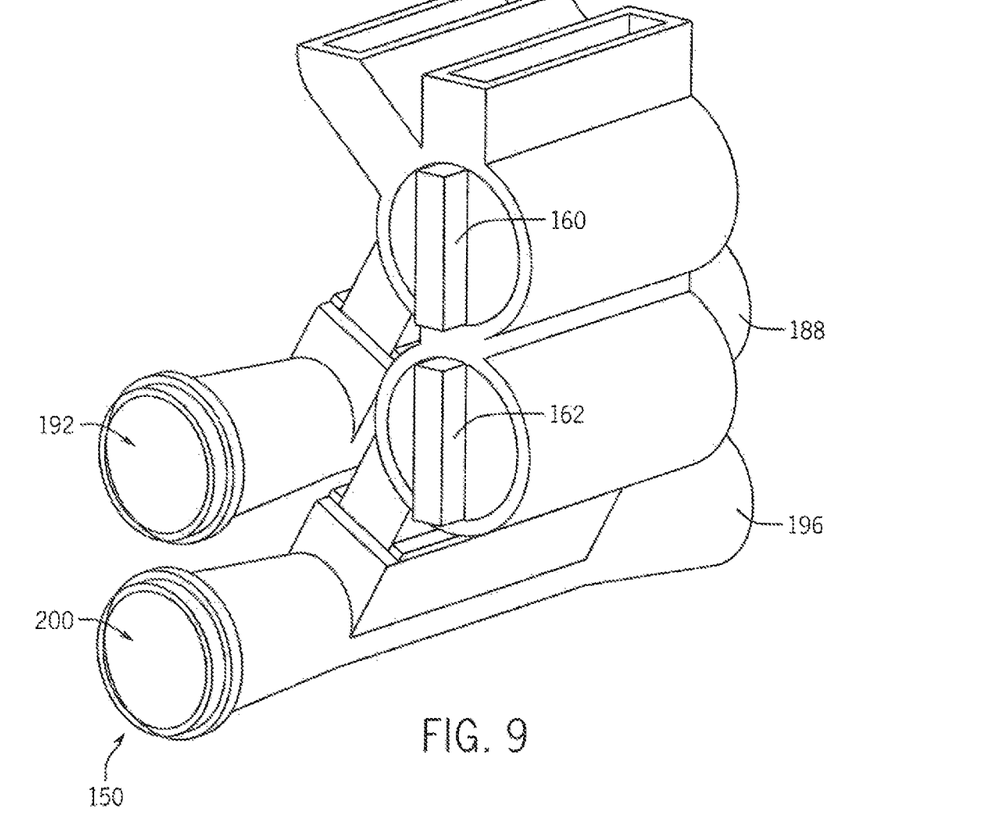
FIG. 9 is an isometric view of an alternate embodiment of collector assembly for the run selection mechanism of the present invention.

Collector assembly 60 further includes first and second selector gates 124 and 126, respectively. First selector gate 124 is pivotably connected to intersection 114 and is movable between a cleanout position. FIG. 5, wherein edge 124a of first selector gate 124 is seated in recessed stop 82 along inner surface 80 of cleanout passage 76 so as to overlap input 105 of first run conduit 104 thereby isolating first run conduit 104 from cleanout passage 76, and hence, from chute 66 and metered product input 62; a second run/calibration position, FIGS. 3 and 6, wherein edge 124a of first selector gate 124 is seated at intersection 83 so as to overlap output 78 thereby isolating cleanout passage 76 and first run conduit 104 from chute 66 and metered product input 62; and a first run position. FIG. 4, wherein edge 124a of first selector gate 124 is seated at stop 72 so as prevent the flow of product 16 through chute 66 to output 68 thereby allowing communication between first run conduit 104 and metered product input 62. As best seen in FIG. 8, linkage 128 may be operatively connected to first selector gate 124 for allowing a user to pivot first selector gate 124 between positions.

Figure 3:
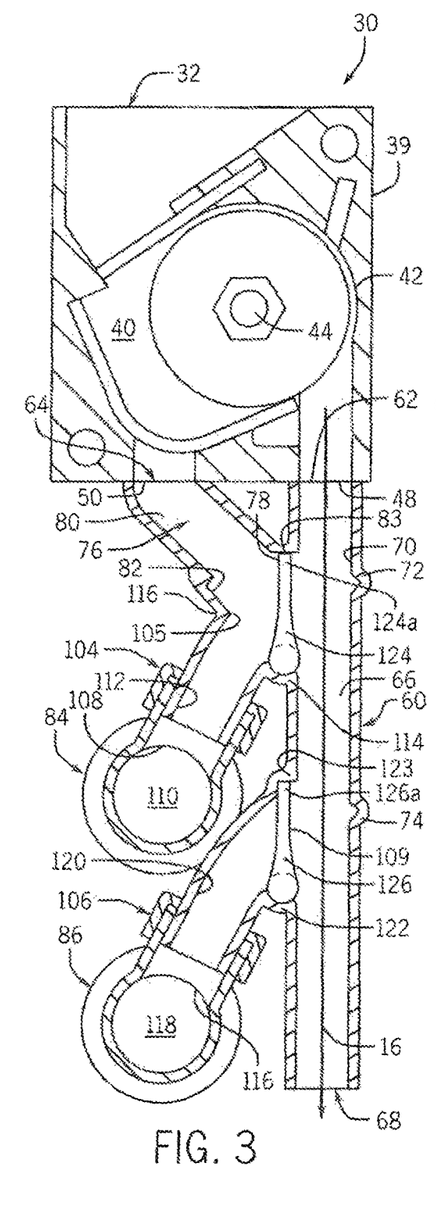
FIG. 3 is a cross-sectional view of the run selection mechanism of the present invention with the selector in a calibration position.
Figure 4:
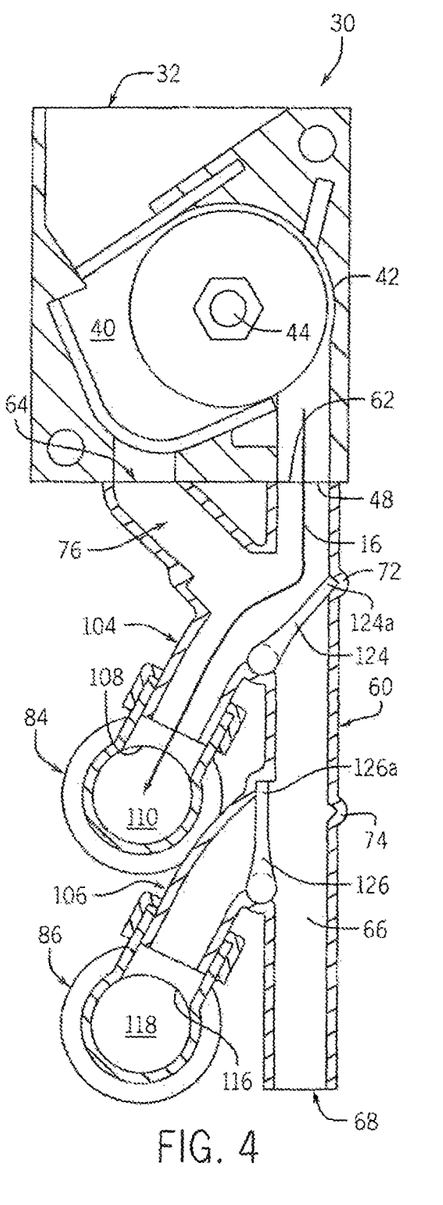
FIG. 4 is a cross-sectional view of the run selection mechanism of the present invention with the selector in a first run position.
Figure 5:
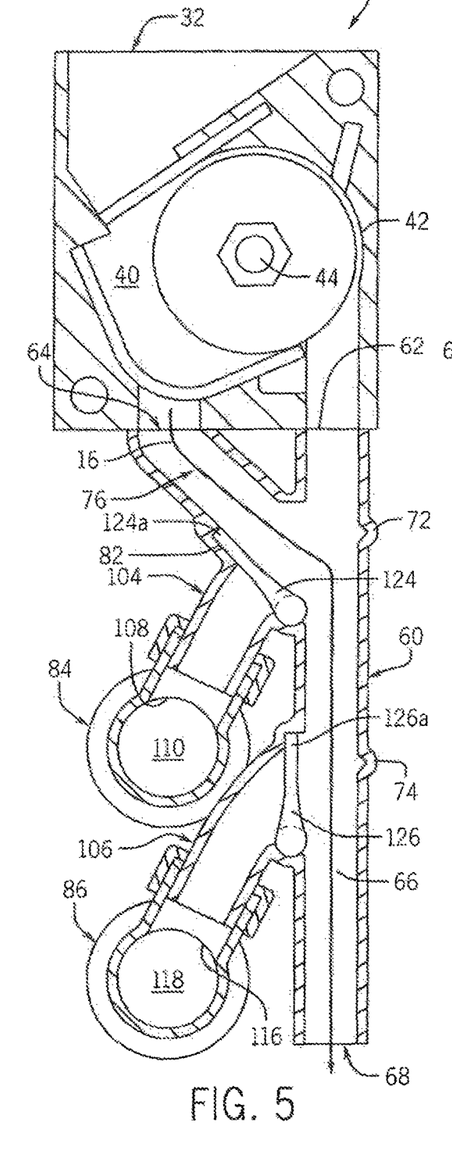
FIG. 5 is a cross-sectional view of the run selection mechanism of the present invention with the selector in a cleanout position.
Figure 6:
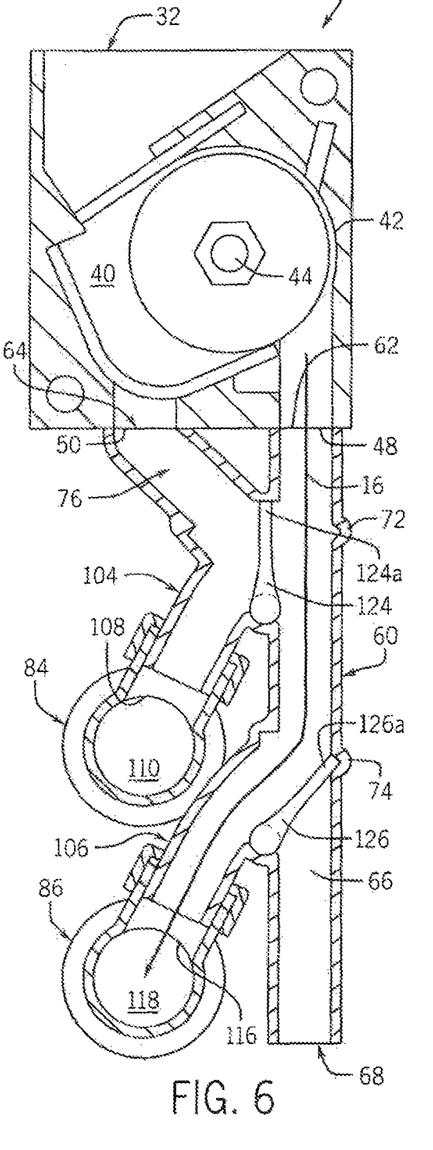
FIG. 6 is a cross-sectional view of the run selection mechanism of the present invention with the selector in a second run position.
Figure 7:
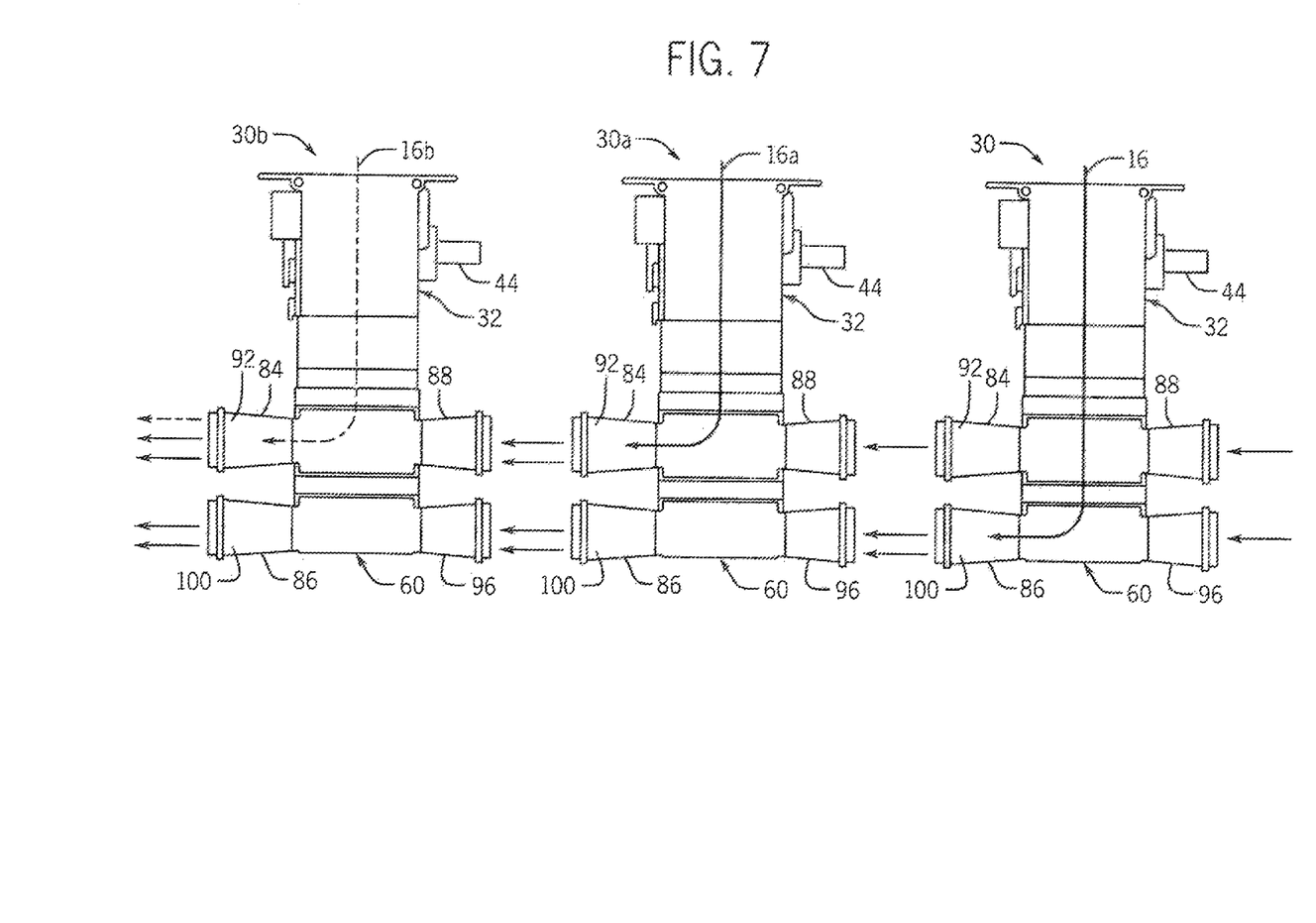
FIG. 7 is a schematic view showing multiple run selection mechanisms of the present invention connected serially.

Second selector gate 126 is pivotably connected to intersection 122 and is movable between a cleanout/calibration/first run position, FIGS. 3-5, wherein edge 126a of second selector gate 126 is seated at intersection 123 so as to overlap input 109 of second run conduit 106 and isolate second run conduit 106 from chute 66 and metered product input 62; and a second run position, FIG. 6, wherein edge 126a of second selector gate 126 is seated at stop 74 so as prevent the flow of product 16 through chute 66 to output 68 and allow communication between second run conduit 106 and metered product input 62. Linkage 130 may be operatively connected to second selector gate 126 for allowing a user to pivot second selector gate 126 between positions.

In operation, in order to calibrate metering roller 42, first selector gate 124 is pivoted to second run/calibration position and the second selector gate 126 is pivoted to the cleanout/calibration/first run position, FIG. 3. With first selector gate 124 in the second run/calibration position and the second selector gate 126 in the cleanout/calibration/first run position, the controller actuates the prime mover so as to rotate metering roller 42. Rotation of metering roller 42 causes product 16 to be delivered from meter module 32, through chute 66 and out of output 68. Product 16 discharged from output 68 of chute 66 may be received in a calibrating container for measurement. Adjustments of the metering roller 42 can then be readily carried out.

In order to cleanout product 16 from chamber 40 of housing 39, first selector gate 124 is pivoted to the cleanout position and the second selector gate 126 is pivoted to the cleanout/calibration/first run position, FIG. 5. With first selector gate 124 in the cleanout position and the second selector gate 126 in the cleanout/calibration/first run position, metered cleanout output 50 of housing 39 is in communication with output 68 through cleanout passage 76 and chute 66. As a result, excess product 16 retained in chamber 40 of housing 39 may be discharged from output 68 of chute 66. It can be appreciated that the cleanout arrangement, heretofore described, allows for any excess product 16 to be drained from storage compartment 22 without having to rotate metering roller 42 (which would take a long time).

In order to introduce product 16 into air flowing through the first primary run, first selector gate 124 is pivoted to first run position and the second selector gate 126 is pivoted to the cleanout/calibration/first run position, FIG. 4. With first selector gate 124 in the first run position and the second selector gate 126 in the cleanout/calibration/first run position, output 108 of first run conduit 104 is communication with metered product output 48 of housing 39 through first run conduit 104 and chute 66. Fan of the pneumatic distribution system 14 is actuated such that air flows sequentially through upstream portion 90 of the first primary run, first run load connector 84 and downstream portion 94 of the first primary run. Thereafter, the controller actuates the prime mover so as to rotate metering roller 42. Rotation of metering roller 42 causes product 16 to be delivered from meter module 32, through chute 66 and first run conduit 104, out of output 108. Product 16 discharged from output 108 of first run conduit 104 is received in the first run load connector 84 and introduced into the air flowing therethrough. Product 16 is then carried by the air flow downstream for the pneumatic distribution thereof to an agricultural field.

In order to introduce product 16 into air flowing through the second primary run, first selector gate 124 is pivoted to the second run/calibration position and the second selector gate 126 is pivoted to the second run position, FIG. 6. With first selector gate 124 in the second run/calibration position and the second selector gate 126 in the second run position, output 116 of second run conduit 106 is communication with metered product output 48 of housing 39 through second run conduit 106 and chute 66. The fan of the pneumatic distribution system 14 is actuated such that air flows sequentially through upstream portion 98 of the second primary run, second run load connector 86 and downstream portion 102 of the second primary run. Thereafter, the controller actuates the prime mover so as to rotate metering roller 42. Rotation of metering roller 42 causes product 16 to be delivered from meter module 32, through chute 66 and second run conduit 106, out of output 116. Product 16 discharged from output 116 of second run conduit 106 is received in second run load connector 86 and introduced into the air flowing therethrough. Product 16 is then carried by the air flow downstream for the pneumatic distribution thereof to an agricultural field.

Referring to FIG. 7, it is contemplated to sequentially position a plurality of run selection modules along the first and second primary runs to introduce multiple types of product into a single air stream for pneumatic delivery to an agricultural field. More specifically, it is contemplated for air cart 10 to include first, second and third storage compartments 22, 22*a* and 22*b* having associated run selection mechanisms 30, 30*a* and 30*b* arranged at their lower ends for receiving a corresponding product 16, 16*a*, and 10*b* therein. First, second and third storage compartments 22, 22*a* and 22*b* are identical in structure. As such, the prior description of storage compartment 22 is understood to describe storage compartments 22*a* and 22*b* as if fully described herein. In addition, it is noted that first, second and third run selection mechanisms 30, 30*a* and 30*b* are identical in structure. As such, the prior description of run selection mechanism 30 is understood to describe run selection mechanisms 30*a* and 30*b* as if fully described herein.

In order to interconnect run selection mechanisms 30 and 30*a*, downstream ends 92 and 100 of first and second run load connectors 84 and 86, respectively, are connected to upstream end 88 of first run load connector 84 of run selection mechanism 30*a* and upstream end 96 of second run load connector 86 of run selection mechanism 30*a*, respectively. Similarly, in order to interconnect run selection mechanisms 30*a* and 30*b*, downstream end 92 of the first run load connector 84 of run selection mechanism 30*a* is operatively connected to upstream end 88 of first run load connector 84 of run selection mechanism 30*b*. In addition, downstream end 100 or second run load connector 86 of run selection mechanism 30*a* is operatively connected to upstream end 96 of second run load connector 86 of run selection mechanism 30*b*. Downstream ends 92 and 100 of first and second run load connectors 84 and 86, respectively, of run selection mechanism 30*b* are operatively connected to drill 12 for pneumatic distribution of products 16, 16*a* and 16*b* to an agricultural field.

By way of example, in operation, products 16, 16*a* and 16*b* are provided in corresponding first, second and third storage compartments 22, 22*a* and 22*b*, respectively. Referring to run selection mechanism 30, in order to introduce product 16 into air flowing through the second primary run, first selector gate 124 is pivoted to the second run/calibration position and the second selector gate 126 is pivoted to the second run position, FIG. 6. Referring to run selection mechanism 30*a*, in order to introduce product 16*a* into air flowing through the first primary run, first selector gate 124 is pivoted to first run position and the second selector gate 126 is pivoted to the cleanout/calibration/first run position, FIG. 4. Finally, referring to run selection mechanism 30*b*, in order to introduce product 16*b* into air flowing through the first primary run, first selector gate 124 is pivoted to first run position and the second selector gate 126 is pivoted to the cleanout/calibration/first run position, FIG. 4.

Once first and second selector gates 124 and 126, respectively, of run selection mechanisms 30, 30*a* and 30*b* are positioned as desired, the fan of the pneumatic distribution system 14 is actuated such that air flows sequentially through the first and second primary runs and the controller(s) actuate the prime movers of run selection mechanisms 30, 30*a* and 30*b* so as to rotate metering rollers 42. With first and second selector gates 124 and 126, respectively, of run selection mechanisms 30, 30*a* and 30*b* positioned as heretofore described, product 16 is discharged into second run load connector 86 of run selection mechanism 30 and introduced into the air flowing therethrough. Product 16 is then carried downstream to second run load connector 86 of run selection mechanism 30*a* and the air flow in the first primary run flows through first run load connector 84 of run selection mechanism 30 to first run load connector 84 of run selection mechanism 30*a*. Similarly, product 16*a* is discharged into first run load connector 84 of run selection mechanism 30*a* and introduced into the air flowing therethrough. Product 16*a* is then carried downstream to first run load connector 84 of run selection mechanism 30*b* and the air flow in the second primary run flows through second run load connector 86 of run selection mechanism 30*a* to second run load connector 86 of run selection mechanism 30*b*. Finally, product 16*b* is discharged into first run load connector 84 of run selection mechanism 30*b* and introduced into the air entrained with product 16*a* flowing therethrough. Products 16*a* and 16*b* are then carried downstream through the first primary run to drill 12 for pneumatic distribution to an agricultural field. Air entrained with product 16 flows through second run load connector 86 of run selection mechanism 30*b* and the second primary run to drill 12 for pneumatic distribution to an agricultural field.

It can appreciated that the noted description is merely exemplary and that the number of run selection mechanisms and the products and/or combination of products distributed may vary without deviating from the scope of the present invention.

Referring to FIG. 8, it is further contemplated to position of a plurality of run selection mechanisms 30 such that they are transversely aligned with and adjacent each other. As such, metering rollers 42 of the plurality of run selection mechanisms may be transversely oriented in relation to the plurality of meter modules 32. Hence, single prime mover may be used to rotate all of the metering rollers 42. By way of example, shafts 44 of the plurality of meter modules may be interconnected by a chain, drive or the like. Alternatively, the prime mover may be operatively connected to a separate common shaft aligned transverse to the axles of the metering rollers 42, wherein the common shaft is coupled through coupling 90 degree gearboxes to the roller axles of each metering roller 42. Further, it is contemplated to interconnect linkages 128 for first selector gates 124 of the plurality of run selection mechanisms 30 such that first selector gates 124 of the plurality of run selection mechanisms 30 may be simultaneously positioned by use of a single handle. Likewise, it is contemplated to interconnect linkages 130 for second selector gates 126 of the plurality of run selection mechanisms 30 such that second selector gates 126 of the plurality of run selection mechanisms 30 may be simultaneously positioned by use of a single handle. Further, it can be appreciated that the opening and closing of cleanout outputs 50 provided at the lower ends of housings 39 of meter modules 32 may be controlled by a single handle to the facilitate operation thereof.

Referring to FIGS. 9-12, an alternate embodiment of a collector assembly for use with run selection mechanism 30 of the present invention is generally designated by the reference numeral 150. Collector assembly 150 includes metered product input 152 in communication with metered product output 50 of housing 39 of metered module 32 and cleanout input 154 in communication with metered cleanout output 50 of housing 39 of meter module 32. Collector assembly 150 further defines first and second chambers 156 and 158, respectively, having generally circular cross-sections and adapted for receiving corresponding first and second rotatable selectors 160 and 162, respectively, therein. First and second selectors 160 and 162, respectively, include first and second inputs 164 and 166, respectively, and outputs 168. Chute 165 communicates with metered product input 152 and has an output 167 communicating with first chamber 156. First and second chambers 156 and 158, respectively, are interconnected by passageway 170 which is axially aligned with output 167 of chute 165, for reasons hereinafter described. Second chamber 158 further includes output 171 which is axially aligned with passageway 170, for reasons hereinafter described.

Cleanout input 154 of collector assembly 150 communicates with cleanout passage 172. Cleanout passage 172 extends through collector assembly 150 and terminates at output 174, which in turn, communicates with first chamber 156. Collector assembly 150 further includes first and second run load connectors 184 and 186, respectively. First run load connector 184 is generally tubular in shape and includes an upstream end 188 receivable within an upstream portion of a first primary run and a downstream end 192 receivable within a downstream portion of the first primary run. The downstream portion of the first primary run may be operatively connected to corresponding drill 12 for pneumatic distribution of the product to an agricultural field. Similarly, second run load connector 186 is generally tubular in shape and includes an upstream end 196 receivable within an upstream portion of a second primary run and a downstream end 200 receivable within a downstream portion of the second primary run.

The downstream portion of the second primary run may operatively connected to drill 12 for pneumatic distribution of the product to an agricultural field.

First run conduit 204 extends through collector assembly 150 and is defined by inner surface 212. First run conduit 204 further includes an input 205 communicating with first chamber 156 and an output 208 communicating with interior 210 of first run load connector 184. Similarly, second run conduit 206 extends through collector assembly 150 and is defined by inner surface 220. Second run conduit 206 includes an input 207 communicating with second chamber 158 and an output 209 communicating with interior 211 of second run load connector 186.

First selector 160 is rotatable between a first run position wherein first input 164 of first selector 160 is axially aligned with and communicates with output 167 of chute 165 and wherein output 168 of first selector 160 is axially aligned with and communicates with input 205 of first run conduit 204, FIG. 10; a second run position wherein first input 164 of first selector 160 is axially aligned with and communicates with output 174 of cleanout passage 172, second input 166 of first selector 160 is axially aligned with and communicates with output 167 of chute 165, and output 168 of first selector 160 is axially aligned with and communicates with passageway 170, FIG. 11; and calibration/cleanout position wherein first input 164 of first selector 160 is axially aligned with and communicates with output 174 of cleanout passage 172, second input 166 of first selector 160 is axially aligned with and communicates with output 167 of chute 165, and output 168 of first selector 160 is axially aligned with and communicates with passageway 170, FIG. 12.

Second selector 162 is rotatable between a first run position wherein second input 166 of second selector 162 is axially aligned with and communicates with passageway 170 and wherein output 168 of second selector 162 is axially aligned with and communicates with output 171 of second chamber 158, FIG. 10; a second run position wherein first input 164 of second selector 162 is axially aligned with and communicates with passageway 170 and wherein output 168 of second selector 160 is axially aligned with and communicates with input 207 of second run conduit 206, FIG. 11; and a calibration/cleanout position wherein first input 164 of second selector 162 is axially aligned with and communicates with passageway 170 and wherein output 168 of second selector 162 is axially aligned with and communicates with output 171 of second chamber 158, FIG. 12.

In operation, in order to calibrate metering roller 42, first and second selectors 160 and 162, respectively, are rotated to their calibration/cleanout positions in any conventional manner such as by means of handle or the like, FIG. 12. With first and second selectors 160 and 162, respectively, in the calibration/cleanout positions, the controller actuates the prime mover so as to rotate metering roller 42. Rotation of metering roller 42 causes product 16 to be delivered from meter module 32 through metered product output 48. Product 16 sequentially flows through: first selector 160 from second input 166 to output 168 thereof; passageway 170; second selector 162 from second input 166 to output 168 thereof; and output 171 of second chamber 158. Product 16 discharged from output 171 of second chamber 158 may be received in a calibrating container for measurement. Adjustments of the metering roller 42 can then be readily carried out.

Figure 12:
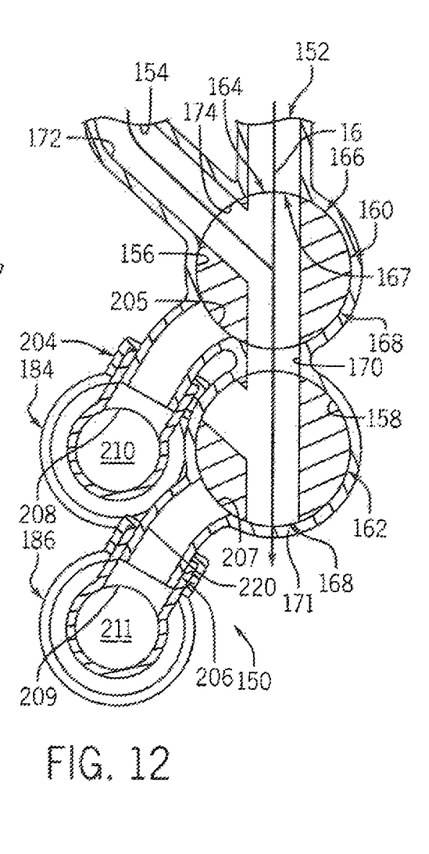
FIG. 12 is a cross-sectional view of the collector assembly of FIG. 9 with the selector in a calibration/cleanout position.

In order to cleanout product 16 from chamber 40 of housing 39, first and second selectors 160 and 162, respectively, are rotated to their calibration/cleanout positions in any conventional manner such as by means of handle or the like, FIG. 12. With first and second selectors 160 and 162, respectively, in the calibration/cleanout positions, metered cleanout output 50 of housing 39 is in communication with first input 164 of first selector 160 through cleanout passage 172. As a result, excess product 16 retained in chamber 40 of housing 39 may be discharged by sequentially flowing through: first selector 160 from first input 164 to output 168 thereof; passageway 170; second selector 162 from second input 166 to output 168 thereof; and output 171 of second chamber 158.

Figure 10:
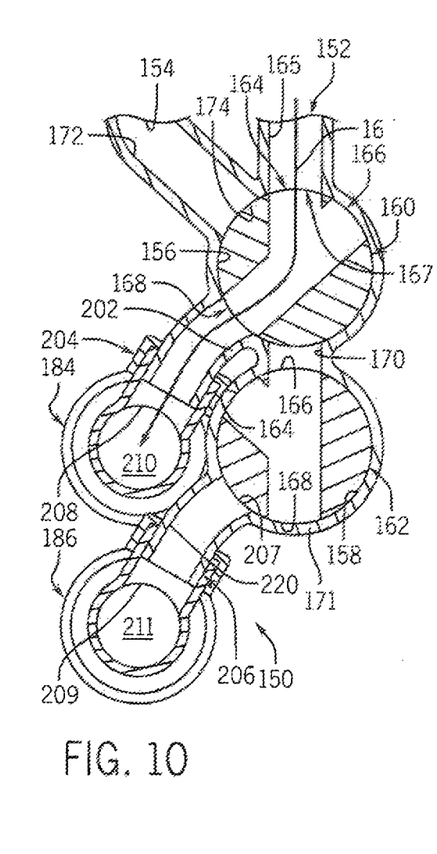
FIG. 10 is a cross-sectional view of the collector assembly of FIG. 9 with the selector in a first run position.

In order to introduce product 16 into air flowing through the first primary run, first and second selectors 160 and 162, respectively, are rotated to their first run positions, in any conventional matter such as by a handle or the like, FIG. 10. With first and second selectors 160 and 162, respectively, in their first run positions, output 208 of first run conduit 204 is communication with metered product output 48 of housing 39 through first run conduit 204, first selector 160, and chute 165. The fan of the pneumatic distribution system 14 is actuated such that air flows sequentially through the upstream portion of the first primary run, first run load connector 184 and the downstream portion of the first primary run. Thereafter, the controller actuates the prime mover so as to rotate metering roller 42. Rotation of metering roller 42 causes product 16 to be delivered from meter module 32, through chute 165, first selector 160 and first run conduit 204, and out of output 208. Product 16 discharged from output 208 of first run conduit 204 is received in the first run load connector 184 and introduced into the air flowing therethrough. Product 16 is then carried by the air flow downstream for the pneumatic distribution thereof to an agricultural field.

Figure 11:
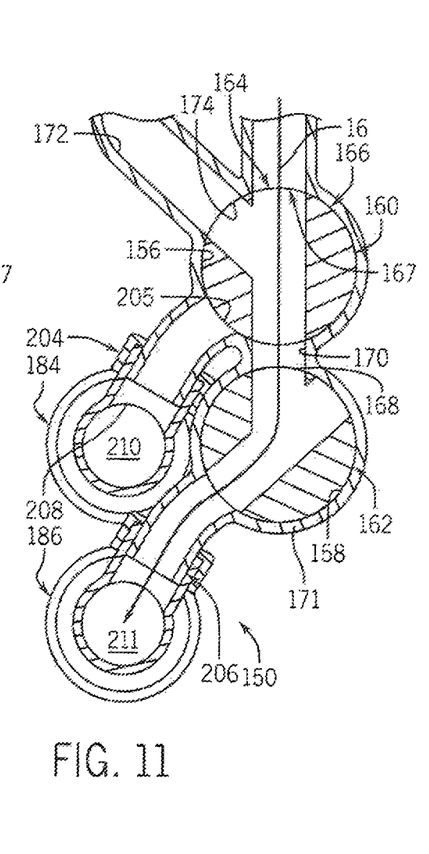
FIG. 11 is a cross-sectional view of the collector assembly of FIG. 9 with the selector in a second run position.

In order to introduce product 16 into air flowing through the second primary run, first and second selectors 160 and 162, respectively, are rotated to their second run positions, in any conventional matter such as by a handle or the like, FIG. 11. With first and second selectors 160 and 162, respectively, in their second run positions, output 209 of second run conduit 206 is communication with metered product output 48 of housing 39 through second run conduit 206, second selector 162, passageway 170, first selector 160 and chute 165. The fan of the pneumatic distribution system 14 is actuated such that air flows sequentially through the upstream portion of the second primary run, second run load connector 186 and the downstream portion of the second primary run. Thereafter, the controller actuates the prime mover so as to rotate metering roller 42. Rotation of metering roller 42 causes product 16 to be delivered from meter module 32, through chute 165, first selector 160, passageway 170, second selector 162 and second run conduit 206, and out of output 209. Product 16 discharged from output 209 of second run conduit 206 is received in second run load connector 186 and introduced into the air flowing therethrough. Product 16 is then carried by the air flow downstream for the pneumatic distribution thereof to an agricultural field.

Various modes of carrying out the invention are contemplated as being within the scope of the following claims particularly pointing out and distinctly claiming the subject matter, which is regarded as the invention.

We claim:

1. A run selection mechanism for selectively directing the flow of particulate material from an air cart, comprising:
    a particulate meter for selectively metering the particulate material;
    a chute for receiving the metered particulate, the chute having an input and an output;
    a first primary conduit having an input communicating with the chute and an output communicating with a first pneumatic primary run;
    a second primary conduit having an input communicating with the chute and an output communicating with a second pneumatic primary run; and
    a selector which includes first and second rotatable members, the first and second rotatable members including passageways therethrough, the passageways partially defining the chute, the selector movable between:
        a calibration position wherein the particulate material flows from the particulate meter to the output of the chute;
        a first primary position wherein the particulate material flows from the particulate meter to the output of the first primary conduit; and
        a second primary position wherein the particulate material flows from the particulate meter to the output of the second primary conduit.

2. The run selection mechanism of claim 1 further comprising a meter module for housing the particulate meter, the meter module including an input for receiving the particulate material from the air cart, a particulate output for directing particulate from the particulate meter to the input of the chute, and a meter cleaning output.

3. The run selection mechanism of claim 1 wherein the selector is further movable to cleanout position wherein the meter cleaning output communicates with the chute.

4. The run selection mechanism of claim 3 wherein the meter cleaning output is isolated from the chute with the selector in the calibration position.

5. The run selection mechanism of claim 1 wherein the selector includes pivotable first and second gates, the first gate isolating the first primary conduit from the chute and the second gate isolating the second primary conduit from the chute with the selector in the calibration position.

6. The run selection mechanism of claim 1 wherein the selector includes a pivotable first gate, the first gate isolating the output of the chute from the input of the chute with the selector in the first primary position.

7. The run selection mechanism of claim 1 wherein the selector includes pivotable first and second gates, the first gate isolating the first primary conduit from the chute and the second gate isolating the output of the chute from the input of the chute with the selector in the second primary position.

\* \* \* \* \*